United States Patent [19]

Kinoshita et al.

[11] Patent Number: 5,417,269
[45] Date of Patent: May 23, 1995

[54] PNEUMATIC TIRE FOR HEAVY VEHICLE

[75] Inventors: Takehiko Kinoshita; Yoshiyuki Takada, both of Akashi, Japan

[73] Assignee: Sumitomo Rubber Industries, Ltd., Kobe, Japan

[21] Appl. No.: 170,774

[22] Filed: Dec. 21, 1993

[30] Foreign Application Priority Data

Dec. 22, 1992 [JP] Japan .................................. 4-341931

[51] Int. Cl.⁶ .............................................. B60C 11/13
[52] U.S. Cl. .......................... 152/209 R; 152/DIG. 1
[58] Field of Search .......... 152/209 R, 209 D, DIG. 1

[56] References Cited

U.S. PATENT DOCUMENTS

| | | | |
|---|---|---|---|
| 2,604,920 | 7/1952 | Kirby | 152/209 R |
| 4,345,632 | 8/1982 | Takigawa et al. | 152/209 R |
| 4,840,211 | 6/1989 | Makino | 152/209 R |
| 5,160,385 | 11/1992 | Goto et al. | 152/209 R |

FOREIGN PATENT DOCUMENTS

| | | | |
|---|---|---|---|
| 227322 | 7/1987 | European Pat. Off. | |
| 62-194908 | 8/1987 | Japan . | |
| 62-231803 | 10/1987 | Japan . | |
| 63-297108 | 12/1988 | Japan . | |
| 3-132403 | 6/1991 | Japan . | |
| 0755137 | 8/1956 | United Kingdom | 152/209 R |

Primary Examiner—Steven D. Maki

[57] ABSTRACT

A pneumatic tire for heavy vehicle comprises first platforms bent at bent sections of a main groove extending zigzag in a circumferential direction of the tire, a second platform linearly extending between one of the first platforms and another of the first platforms, and a third platform extending between the one of the first platforms and the second platform, wherein the first, second, and third platforms are arranged at a bottom of the main groove within half a pitch of the main groove, a length of the first platform in the circumferential direction of the tire, a length of the second platform in the circumferential direction of the tire, and a length from one end of the one of the first platforms to one end of the another of the first platforms are different from each other; a length of the one of the first platforms is larger than the length of the second platform, and a width of each of the first and second platforms in an axial direction orthogonal to the circumferential direction of the tire and a height from the bottom of the main groove of each of the first and second platforms are set to be larger than a width of the third platform in the axial direction orthogonal to the circumferential direction of the tire and a height of the third platform from the bottom of the main groove, respectively.

4 Claims, 3 Drawing Sheets

Fig. 4
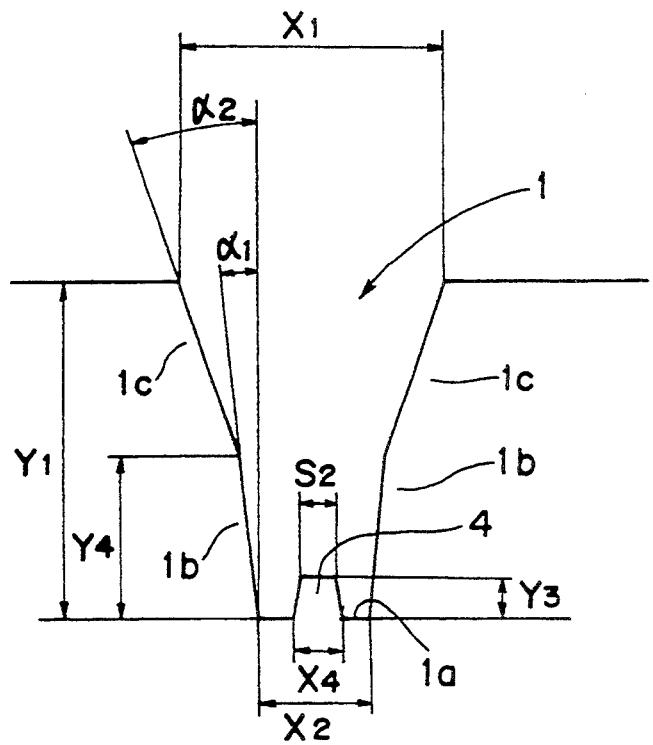
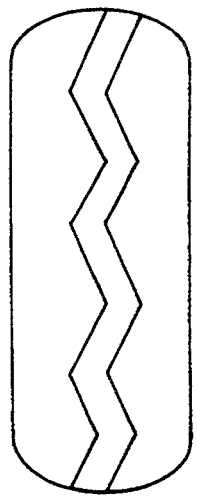
Fig. 5
PRIOR ART
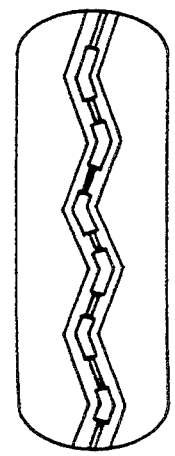
Fig. 6
PRIOR ART

PNEUMATIC TIRE FOR HEAVY VEHICLE

BACKGROUND OF THE INVENTION

The present invention relates to an improvement of heavy pneumatic tires for vehicles, and more particularly to pneumatic tires for use in trucks or buses designed to lessen catching of stones.

A main groove at the center of a plurality of grooves formed in a pneumatic radial-ply tire for heavy vehicle has been known to scarcely release catching stones when it is detached from the ground because the motion there is restricted by a metallic cord or the like. The stones are disadvantageously prone to be held in the groove and the tire catching the stones is damaged at the revolution. The damage is more and more propagated with the revolution of the tire.

In one proposal to avoid the aforementioned problem, the main groove, specifically, the side wall of the main groove is stepped or a platform is formed at the bottom face of the groove. Although the arrangement of this kind is effective to protect the bottom of the groove, it does not sufficiently work as a countermeasure to the catching of stones.

Naturally, the tire without any protection catches stones during running on a bad road, thereby inviting the breakage of the cord. The tire may be consequently impossible to reform.

SUMMARY OF THE INVENTION

The object of the present invention is therefore to provide a pneumatic tire for use in heavy vehicles which is designed to effectively release stones, if any, from a groove in which the stones are caught during running and equipped with superior steps against catching of stones.

In order to achieve the above-described object, according to the present invention, there is provided a pneumatic tire for heavy vehicle comprising: first platforms bent at bent sections of a main groove extending zigzag in a circumferential direction of the tire; a second platform linearly extending between one of the first platforms and another of the first platforms; and a third platform extending between the one of the first platforms and the second platform; wherein the first, second, and third platforms are arranged at a bottom of the main groove within half a pitch of the main groove; a length of the first platform in the circumferential direction of the tire, a length of the second platform in the circumferential direction of the tire, and a length from one end of the one of the first platforms to one end of the another of the first platforms are different from each other; the length of the one of the first platforms in the circumferential direction is larger than the length of the second platform in the circumferential direction; and a width of each of the first and second platforms in a axial direction orthogonal to the circumferential direction of the tire and a height from the bottom of the main groove of each of the first and second platforms are set to be larger than a width of the third platform in the axial direction orthogonal to the circumferential direction of the tire and a height of the third platform from the bottom of the main groove, respectively.

In the above-described constitution of the present invention, the countermeasure to catching of stones is remarkably improved through the combination of two characteristic features, namely, that each width of the first and second platforms and the width of the third platform are different in the axial direction of the tire and that the inclining angle of the outer surface of the main groove is not smaller than that of the inner surface so as to make small the width of the inner side closer to the bottom of the main groove than the outer side. More specifically, the first platform which is wide both in the circumferential direction and in the axial direction of the tire is arranged at the bent part of the main groove where a stone is easy to bite. If the stone is caught in the main groove when the tire comes in contact with the ground, since the repulsive force is accumulated in the first platform and moreover, the caught stone is rotated along with the tire, the stone can be discharged out from the main groove owing to the repulsive force when the tire is away from the ground. Even if the stone is disposed between the confronting inner surfaces of the main groove, since the outer surface of the side wall of the main groove is inclined equal to or larger than the inner surface and the repulsive force of the inner surface is accumulated when the tire is in touch with the ground, the entered stone rotated with the tire is discharged out of the main groove by the repulsive force accumulated in the inner surface when the tire separates from the ground.

BRIEF DESCRIPTION OF THE DRAWINGS

These and other objects and features of the present invention will become clear from the following description taken in conjunction with one preferred embodiment thereof with reference to the accompanying drawings, in which:

FIG. 4 is a longitudinal sectional view of a third platform in the main groove of FIG. 1;

FIG. 5 is a schematic plane view of a conventional tire without a platform; and

FIG. 6 is a schematic plane view of a conventional tire having a platform formed only at the bent part.

DETAILED DESCRIPTION OF THE PREFERRED EMBODIMENT

Figure 1:
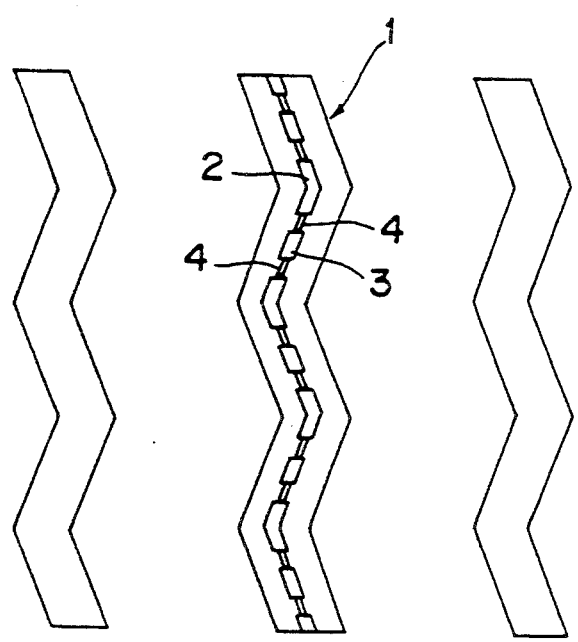
FIG. 1 is a schematic plane view of grooves in a pneumatic tire for heavy vehicle according to one embodiment of the present invention.

Before the description of the present invention proceeds, it is to be noted that like parts are designated by like reference numerals throughout the accompanying drawings.

A preferred embodiment of the present invention will be discussed in detail with reference to FIGS. 1-4 hereinbelow.

Figure 2:
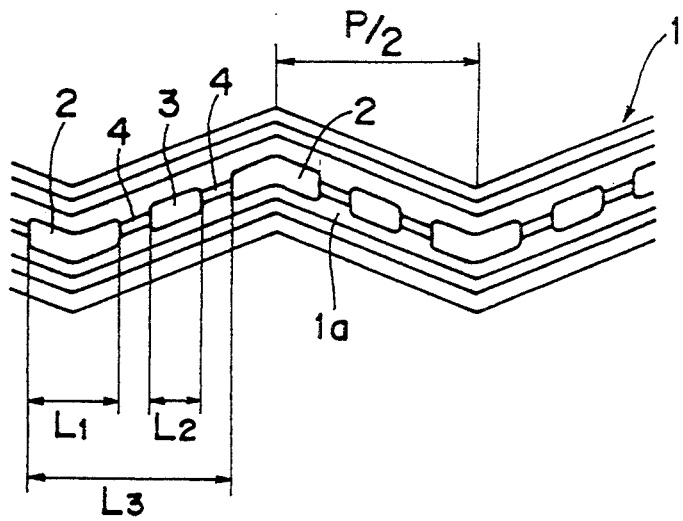
FIG. 2 is an enlarged view of a main groove of FIG. 1.

A main groove 1 of a pneumatic tire for heavy vehicle according to the embodiment is, as shown in FIGS. 1, 2, arranged in a zigzag at the center of the tire extending in the circumferential direction. There are formed at a bottom 1a of the main groove 1 within half the pitch (P/2) among a plurality of grooves of the tire, a first platform 2 bent at the bent part of the main groove 1, a second platform 3 linearly extending between the first platforms 2, and a third platform 4 linearly extending between the first and second platforms 2 and 3. In other words, half of the first platform 2, the third platform 4, the second platform 3, the third platform 4, and half of the first platform 2 are sequentially continuously formed within half the pitch of the main groove 1. The number of the platforms within half the pitch is not restricted to the above, but any kind of platforms with three or more different lengths can be arranged in the circumferential direction of the tire and also any optional kind of platforms with two or more different widths can be aligned in the axial direction of the tire.

As is clear from FIG. 2, the length L1 of the first platform 2 is made different from the length L2 of the second platform 3 in the circumferential direction of the tire. Moreover, the length L1 is different from the length L3 from one end of the first platform 2 to one end of the next first platform 2 via the second platform 3 (corresponding to half the zigzag pitch of the main groove 1, i.e., P/2). The length L2 is different from the length L3. The length L1 is larger than the length L2 which is also different from the length L3.

Figure 3:
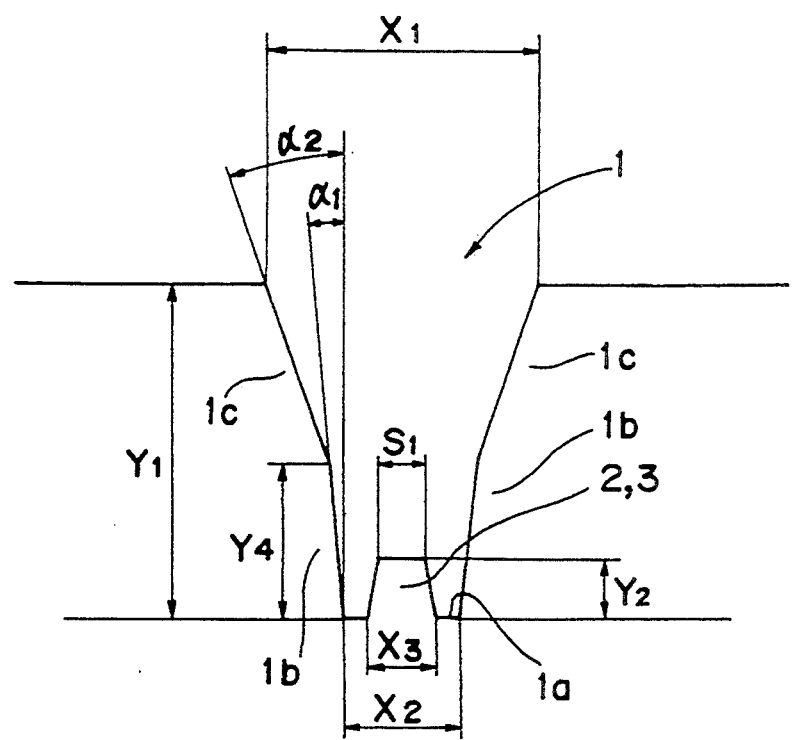
FIG. 3 is a longitudinal sectional view of a first and a second platforms in the main groove of FIG. 1.

As indicated in FIGS. 3 and 4, each width S1 of the first and second platforms 2 and 3 in the axial direction orthogonal to the circumferential direction of the tire is set larger than the width S2 of the third platform 4. Similarly, each height Y2 of the first and second platforms 2 and 3 from the bottom 1a is made larger than the height Y3 of the third platform 4 from the bottom 1a of the main groove.

Because of the three kinds of platforms 2, 3, and 4 formed in the main groove 1, it becomes possible to effectively release stones caught in a part of the main groove 1 when the platforms are separated from the ground. Since the first platform 2 is greatly bent in a V-shape at the bent part of the main groove 1 where stones are easy to catch, with having the second platform 3 of the same width arranged between the bent parts in the radial direction of the tire, the repulsive force of the first platform 2 is so large as to release the stone easily even if the stone is caught at the upper surface of the first platform 2. Further, if the stone is lodged between the large first platforms 2, the edge of the upper surface of the second or third platform 3 or 4 is deformed to support the stone, so that the repulsive force subsequent to the deformation of the edge is enlarged, thereby increasing the degree of freedom in the direction to discharge the stone. Accordingly, the countermeasure against catching of stones is rendered remarkably effective. In comparison with the prior art design wherein the platforms are linear, or the length or width of the platforms is uniform or not so varied, the number of the platforms is increased in the embodiment, and consequently a larger number of edges is effectuated. As a result, the tire becomes more resistant to shocks and hard to break when hitting the road surface or touching the ground.

Meanwhile, the side wall of the main groove 1 is defined by two inclined surfaces 1b and 1c of different inclining angles. The inner surface 1b positioned closer to the bottom 1a of the groove is inclined the same or less than the outer surface 1c. The reason for this is to remarkably improve the releasing function of stones by synergistic effect based on the effect of the countermeasure against catching of stones in addition to the effect achieved by the three platforms 2, 3, and 4 and to greatly improve the releasing efficiency of stones with the platforms 2, 3, and 4.

It is preferable to constitute the main groove to satisfy a formula: the width X1 of the main groove at the tread surface > the width X2 of the bottom of the main groove so as to make it easy to discharge caught stones.

A concrete example of a tire embodied by the present invention will be specified in the table 1 below.
Table 1
* Inclining angle $\alpha 1$ of main groove: $\alpha 1 = 3 - 20°$
* Inclining angle $\alpha 2$ of main groove: $\alpha 2$ ($\alpha 2 \geq \alpha 1$) = $4 - 30°$
* Length L3 of one pitch of platform: L3 = 0.5 − 3.0% of the outer periphery of the tire
* Heights Y2 and Y3 (Y2>Y3) of platform to depth Y1 of groove: Y2 = 5.0 − 50.0% of Y1, Y3 = 5.0 − 50.0% of Y1
* Widths S1 and S2 of platform: S1 < X3 and S2 < X4 (S1 > S2)
* Ratio of lengths L1 and L2 of platform to pitch L3 of platform: L1 = 20 − 80% of L3, L2 = 10 − 40% of L3 (L1 > L2)
* Width X2 of bottom of groove: X1 > X2

The reason for the above relationship is as follows. If $\alpha 2 < \alpha 1$ is set for the inclining angle of the main groove 1, the stones caught in the main groove 1 are hard to release. If the height of the platform holds Y2 ≦ Y3, the repulsive force of the first and second platforms 2 and 3 becomes smaller than or equal to that of the third platform 4 when the stone is caught in the main groove 1, and therefore the discharging efficiency from the main groove 1 is decreased. At the same time, if the width of the platform is set to satisfy S1 ≦ S2, the repulsive force of the first and second platforms 2 and 3 when the stone is caught in the main groove 1 becomes smaller than or equal to that of the third platform 4, resulting in the lowered efficiency to release the caught stone from the main groove 1. Likewise, if L1 ≦ L2, the repulsive force of the first platform 2 is undesirably smaller than that of the second platform 3. The repulsive force of the first platform 2 formed at the bent part of the main groove 1 where the stones are most easy to catch should be larger than that of the other platform 3.

According to the embodiment, the lengths of the first, second, and the third platforms 2, 3, and 4 at the bottom 1a of the main groove 1 of the tire are made different from each other, and moreover, the outer surface 1c of the side wall closer to the bottom 1a of the groove is inclined the same angle as or larger than the inner surface 1b. Therefore, the tire is more effectively protected against catching of stones by the synergistic effect based on the features. In other words, since the first platform 2, wide in both circumferential and radial directions of the tire, is formed at the bent part of the main groove 1 where stones easily to enter, the repulsive force is accumulated in the first platform 2 when the stone is lodged as the platform comes into contact with the ground. The entered .stone rotated along with the tire is discharged out from the main groove 1 owing to the repulsive force in the first platform 2 when the tire is separated from the ground. Moreover, since the outer surface 1c of the side wall of the main groove 1 is inclined more or by the same angle than the inner surface 1b, the repulsive force of the inner surface 1b is accumulated when the stone is caught between the confronting inner surfaces 1b. The entered stone is rotated along with the tire and is easily discharged out of the main groove 1 by the accumulated repulsive force when it is separated from the ground.

The tire of the embodiment is evaluated in comparison with conventional tires having a zigzag pattern of the groove as shown in FIGS. 5 and 6. FIG. 5 shows a plane view of a conventional tire without a platform, and FIG. 6 illustrates a conventional tire with a platform only at the bent part. The tire of the embodiment is such as shown in FIG. 1, having the platform of the size L3=30.9 mm, L2=7.0 mm, L1=13.0 mm, Y2=3.5 mm, Y3=2.0 mm, S1=4.0 mm, and S2=1.6 mm. The performance of the tire according to the embodiment is highly superior to that of the conventional tire with the platform, as represented in the table 2 below.

TABLE 2

|  | Conventional tire without platform | Conventional tire with platform only at bent part | Tire of embodiment |
| --- | --- | --- | --- |
| Width of groove X1 | 17.5 | 17.5 | 17.5 |
| Width of bottom of groove X2 | 10 | 10 | 4.0 |
| Inclining angle $\alpha 1$ | 26° | 26° | 6.0° |
| Inclining angle $\alpha 2$ | — | — | 19° |
| Depth Y1 | 16.3 | 16.3 | 16.3 |
| Stone catching factor | 100 | 72 | 0 |

It is to be noted here that the "stone catching factor" is an index representing the number of catching stones after the vehicle runs 1.6 km backward on the gravel of the dry riverbed along a river on the assumption that the conventional tire indicates the stone catching factor 100. That is, the larger the factor is, the inferior the counter-catching efficiency is.

The present invention is not limited to the above-depicted embodiment, and may be executed in the other embodiments.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A pneumatic tire for heavy vehicle comprising:

first platforms bent at bent sections of a main groove extending zigzag in a circumferential direction of the tire;

a second platform linearly extending between one of the first platforms and another of the first platforms; and a third platform extending between said one of the first platforms and the second platform, wherein the first, second, and third platforms are arranged at a bottom of the main groove within half a pitch of the main groove;

a length of the one of the first platforms in the circumferential direction of the tire, a length of the second platform in the circumferential direction of the tire, and a length from one end of said one of the first platforms to one end of said another of the first platforms are different from each other;

the length of said one of the first platforms in the circumferential direction is larger than the length of the second platform in the circumferential direction; and a width of each of the first and second platforms in an axial direction orthogonal to the circumferential direction of the tire and a height from the bottom of the main groove of each of the first and second platforms are larger than a width of the third platform in the axial direction orthogonal to the circumferential direction of the tire and a height of the third platform from the bottom of the main groove, respectively.

2. The pneumatic tire as claimed in claim 1, wherein a side wall of the main groove is defined by two inclined surfaces, one of the two inclined surfaces is closer to the bottom of the main groove than the other inclined surface and the inclining angle of the inclined surface which is closer to the bottom of the maingroove is not larger than an inclining angle of the other inclined surface.

3. The pneumatic tire as claimed in claim 1, wherein the main groove has a first groove width at the tread surface and a second groove width at the bottom of the main groove, the first groove width being greater than the second groove width.

4. The pneumatic tire as claimed in claim 2, wherein the main groove has a first groove width at the tread surface and a second groove width at the bottom of the main groove, the first groove width being greater than the second groove width.

* * * * *